United States Patent
Murakami

(10) Patent No.: US 10,670,190 B2
(45) Date of Patent: Jun. 2, 2020

(54) APPARATUS AND METHOD FOR REMAINING-LP-GAS DISPLAY CONTROL

(71) Applicant: Azbil Kimmon Co., Ltd., Toshima-ku (JP)

(72) Inventor: Eiji Murakami, Toshima-ku (JP)

(73) Assignee: Azbil Kimmon Co., Ltd., Toshima-ku (JP)

( * ) Notice: Subject to any disclaimer, the term of this patent is extended or adjusted under 35 U.S.C. 154(b) by 0 days.

(21) Appl. No.: 16/208,866

(22) Filed: Dec. 4, 2018

(65) Prior Publication Data

US 2019/0170301 A1 Jun. 6, 2019

(30) Foreign Application Priority Data

Dec. 5, 2017 (JP) .................................. 2017-233468

(51) Int. Cl.
*F17C 13/02* (2006.01)
*F23N 5/24* (2006.01)
(Continued)

(52) U.S. Cl.
CPC ................ *F17C 13/02* (2013.01); *F17C 5/06* (2013.01); *F23N 5/242* (2013.01); *G01F 13/008* (2013.01); *G01F 15/075* (2013.01); *G01F 15/0755* (2013.01); *G01F 23/0076* (2013.01); *F17C 2203/0673* (2013.01); *F17C 2221/012* (2013.01); *F17C 2221/035* (2013.01); *F17C 2223/0153* (2013.01); *F17C 2223/033* (2013.01); *F17C 2225/0123* (2013.01); *F17C 2225/035* (2013.01); *F17C 2225/036* (2013.01); *F17C 2227/04* (2013.01);
(Continued)

(58) Field of Classification Search
CPC ............... F17C 13/02; F23N 2005/185; G01F 23/0076; G01F 15/075; G01F 15/0755; G01F 13/008
See application file for complete search history.

(56) References Cited

U.S. PATENT DOCUMENTS 9,803,470 B2 * 10/2017 Mashetty ................ E21B 47/00
10,119,657 B2 * 11/2018 Suman ................... F17C 13/026
(Continued)

FOREIGN PATENT DOCUMENTS

JP 3525404 B2 5/2004

*Primary Examiner* — Paul M. West
(74) *Attorney, Agent, or Firm* — Oblon, McClelland, Maier & Neustadt, L.L.P.

(57) ABSTRACT

A remaining-LP-gas display control apparatus includes a consumption obtaining unit that obtains daily gas consumptions in a tank, a consumption predicting unit that predicts future daily gas consumptions for a set number of days such that each future gas consumption is predicted based on the latest gas consumption on the same day of the week included in the gas consumptions obtained by the consumption obtaining unit, a replacement date predicting unit that predicts the amounts of gas remaining in the tank and a date on which the gas remaining in the tank will be used up by using the obtained gas consumptions and the predicted future gas consumptions, and a display control unit that controls a display unit to display an image in which remaining-gas information is superimposed on a location where the tank is placed by using the predicted date and location information.

10 Claims, 9 Drawing Sheets

(51) Int. Cl.
*G01F 23/00* (2006.01)
*F17C 5/06* (2006.01)
*G01F 15/075* (2006.01)
*G01F 13/00* (2006.01)
*F23N 5/18* (2006.01)

(52) U.S. Cl.
CPC .. *F17C 2227/044* (2013.01); *F17C 2250/043* (2013.01); *F17C 2250/0443* (2013.01); *F17C 2250/0473* (2013.01); *F17C 2260/026* (2013.01); *F17C 2265/065* (2013.01); *F17C 2270/0168* (2013.01); *F23N 2005/185* (2013.01)

(56) References Cited

U.S. PATENT DOCUMENTS

| | | | | |
|---|---|---|---|---|
| 2007/0039662 | A1* | 2/2007 | Shuey | G01D 21/00 |
| | | | | 141/94 |
| 2016/0381440 | A1* | 12/2016 | Davis | H04Q 9/00 |
| | | | | 340/870.02 |
| 2018/0060977 | A1* | 3/2018 | McShane | G06Q 50/06 |

* cited by examiner

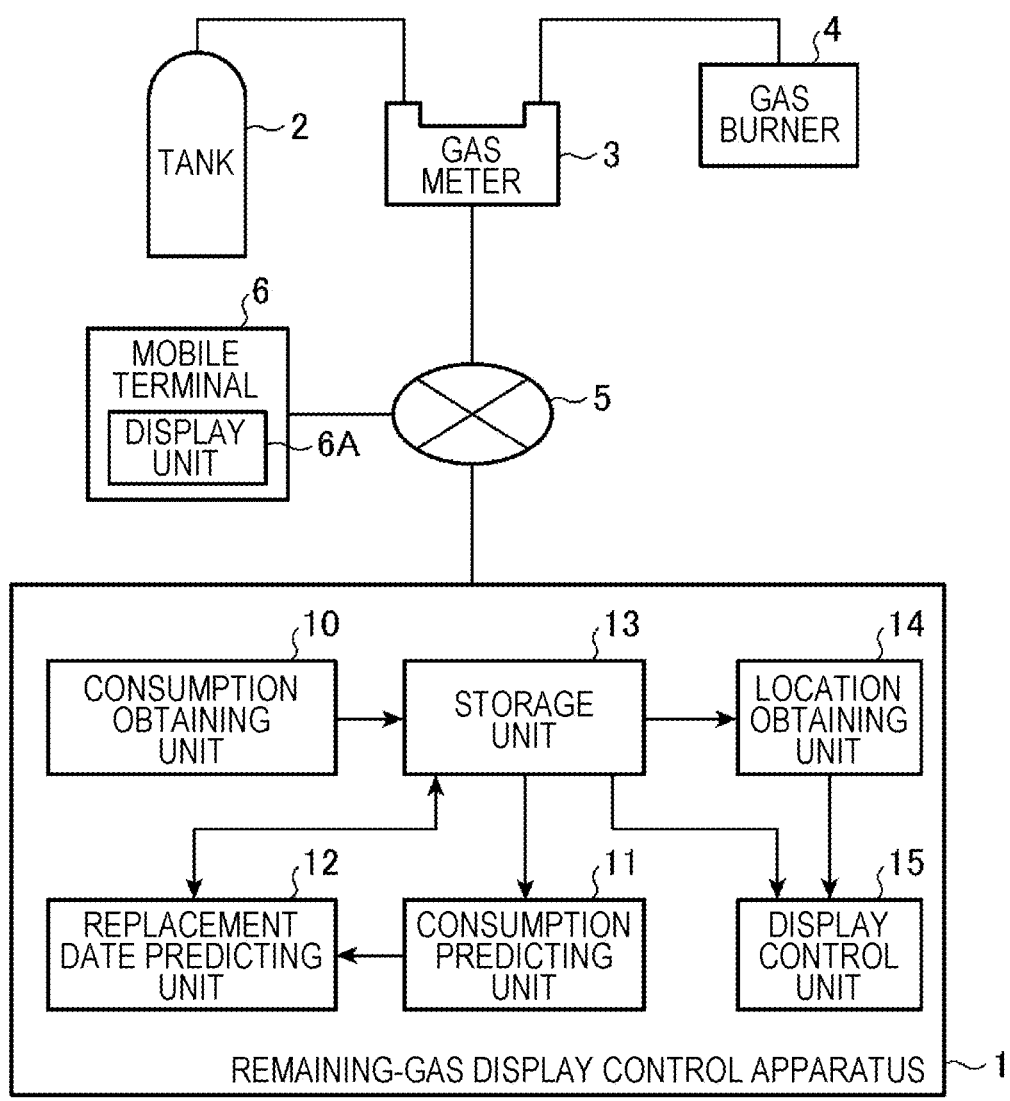

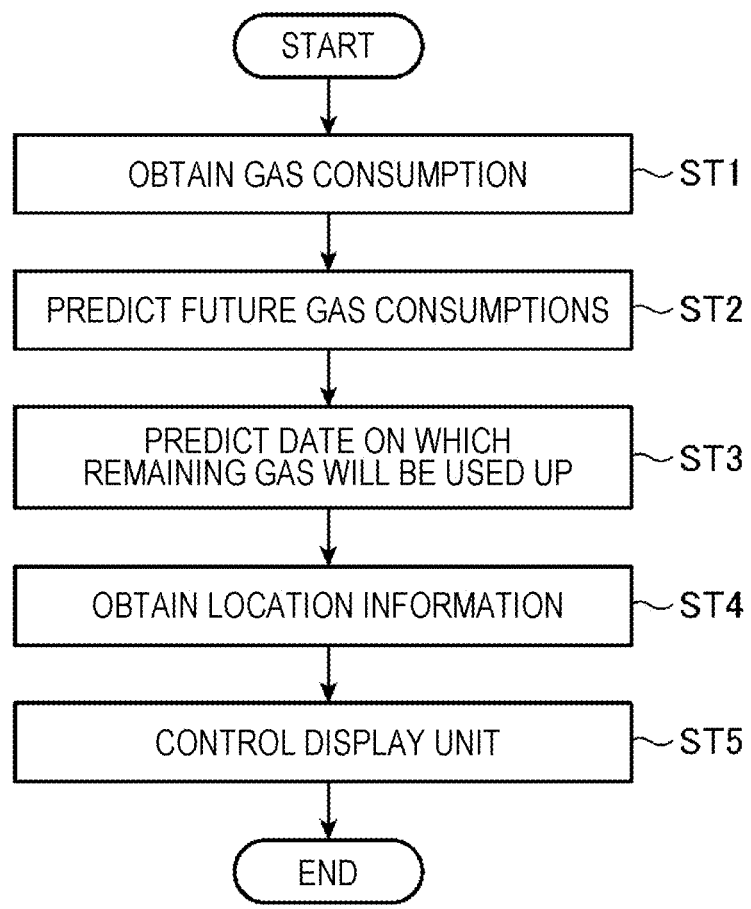

FIG. 3A

| NUMBER OF USE DAYS | 0 | 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|---|---|---|---|---|---|---|
| DAY OF WEEK | SAT. | SUN. | MON. | TUES. | WED. | THURS. | FRI. | SAT. | SUN. | MON. | TUES. | WED. | THURS. | FRI. | SAT. | SUN. | MON. | TUES. | WED. | THURS. | FRI. | SAT. |
| DAILY GAS CONSUMPTION | 0 | 10 | 2 | 3 | 2 | 3 | 2 | 9 | 10 | 2 | 3 | 2 | 3 | 2 | 9 | 10 | 2 | 3 | 2 | 3 | 2 | 9 |
| ACCUMULATED GAS CONSUMPTION | 0 | 10 | 12 | 15 | 17 | 20 | 22 | 31 | 41 | 43 | 46 | 48 | 51 | 53 | 62 | 72 | 74 | 77 | 79 | 82 | 84 | 93 |
| REMAINING AMOUNT | 200 | 190 | 188 | 185 | 183 | 180 | 178 | 169 | 159 | 157 | 154 | 152 | 149 | 147 | 138 | 128 | 126 | 123 | 121 | 118 | 116 | 107 |
| PREDICTED DAILY GAS CONSUMPTION | | | | | | | | | 10 | 2 | 3 | 2 | 3 | 2 | 9 | 10 | 2 | 3 | 2 | 3 | 2 | 9 |
| PREDICTED REMAINING AMOUNT | | | | | | | | | 159 | 157 | 154 | 152 | 149 | 147 | 138 | 128 | 126 | 123 | 121 | 118 | 116 | 107 |

LEARNING PERIOD (days 0–7)

PREDICTED VALUES BASED ON DATA ABOUT NUMBERS OF USE DAYS RANGING BETWEEN 1 AND 7

FIG. 3B

| NUMBER OF USE DAYS | 22 | 23 | 24 | 25 | 26 | 27 | 28 | 29 | 30 | 31 | 32 | 33 | 34 | 35 |
|---|---|---|---|---|---|---|---|---|---|---|---|---|---|---|
| DAY OF WEEK | SUN. | MON. | TUES. | WED. | THURS. | FRI. | SAT. | SUN. | MON. | TUES. | WED. | THURS. | FRI. | SAT. |
| DAILY GAS CONSUMPTION | 10 | 2 | 3 | 2 | 3 | 2 | 9 | 10 | 2 | 3 | 2 | 3 | 2 | 9 |
| ACCUMULATED GAS CONSUMPTION | 103 | 105 | 108 | 110 | 113 | 115 | 124 | 134 | 136 | 139 | 141 | 144 | 146 | 155 |
| REMAINING AMOUNT | 97 | 95 | 92 | 90 | 87 | 85 | 76 | 66 | 64 | 61 | 59 | 56 | 54 | 45 |

Columns 29–35: LEARNING PERIOD

| PREDICTED DAILY GAS CONSUMPTION | | |
|---|---|---|
| PREDICTED REMAINING AMOUNT | | |

FIG. 3C

| | | | | | | | | | | | | | | | |
|---|---|---|---|---|---|---|---|---|---|---|---|---|---|---|---|
| NUMBER OF USE DAYS | 36 | 37 | 38 | 39 | 40 | 41 | 42 | 43 | 44 | 45 | 46 | 47 | 48 | 49 | 50 |
| DAY OF WEEK | SUN. | MON. | TUES. | WED. | THURS. | FRI. | SAT. | SUN. | MON. | TUES. | WED. | THURS. | FRI. | SAT. | SUN. |
| DAILY GAS CONSUMPTION | 10 | 2 | 3 | 2 | 3 | 2 | 9 | 10 | 2 | 3 | 2 | 3 | 2 | 9 | 10 |
| ACCUMULATED GAS CONSUMPTION | 165 | 167 | 170 | 172 | 175 | 177 | 186 | 196 | 198 | 201 | 203 | 206 | 208 | 217 | 227 |
| REMAINING AMOUNT | 35 | 33 | 30 | 28 | 25 | 23 | 14 | 4 | 2 | −1 | −3 | −6 | −8 | −17 | −27 |
| PREDICTED DAILY GAS CONSUMPTION | 10 | 2 | 3 | 2 | 3 | 2 | 9 | 10 | 2 | 3 | 2 | 3 | 2 | 9 | |
| PREDICTED REMAINING AMOUNT | 35 | 33 | 30 | 28 | 25 | 23 | 14 | 4 | 2 | −1 | −3 | −6 | −8 | −17 | |

PREDICTED VALUES BASED ON DATA ABOUT NUMBERS OF USE DAYS RANGING BETWEEN 29 AND 35

APPARATUS AND METHOD FOR REMAINING-LP-GAS DISPLAY CONTROL

CROSS-REFERENCE TO RELATED APPLICATIONS

The present application is based on and claims priority to Japanese Application No. 2017-233468, filed Dec. 5, 2017, the entire contents of which are incorporated herein by reference.

BACKGROUND

1. Field

The present disclosure relates to a display control apparatus that controls a display unit to display information about liquefied petroleum (LP) gas (hereinafter, also referred to simply as "gas") remaining in a tank.

2. Description of the Related Art

LP gas supply systems are generally known. In such a system, gas in a container is supplied to a gas meter through a pipe and the gas is further supplied from the gas meter to a gas burner located at a terminal through a pipe, as described in Japanese Patent No. 3525404, for example. In an LP gas supply system described in Japanese Patent No. 3525404, the amount of gas used is accumulated by using a flow rate sensor attached to a gas meter, and the accumulated value is reported as a reading to an information center at predetermined date and time.

As in the LP gas supply system described in Japanese Patent No. 3525404, an obtained reading can be used to calculate the amount of gas remaining in an LP gas tank at that point in time.

An LP gas tank needs to be replaced with a new one filled with gas before the tank is empty. Therefore, it is important for, for example, gas suppliers to locate an LP gas tank that is likely to be empty and needs to be replaced. In related-art LP gas supply systems including the system described in Japanese Patent No. 3525404, however, any consideration is not given to ensure that the location of an LP gas tank that needs to be replaced is identified. Disadvantageously, it takes time and effort to find a tank that needs to be replaced.

SUMMARY

The present disclosure has been made to overcome the above-described disadvantages, and aims to provide a remaining-LP-gas display control apparatus that allows effective display of the location of an LP gas tank needing to be replaced such that the tank can be identified.

An aspect of the present disclosure provides a remaining-LP-gas display control apparatus including a consumption obtaining unit that obtains daily gas consumptions in a tank, a consumption predicting unit that predicts future daily gas consumptions for a set number of days such that each future gas consumption is based on the latest gas consumption on the same day of the week included in the gas consumptions obtained by the consumption obtaining unit, a remaining-amount predicting unit that predicts the amounts of gas remaining in the tank by using the gas consumptions obtained by the consumption obtaining unit and the future gas consumptions for the set number of days predicted by the consumption predicting unit, a replacement date predicting unit that predicts, based on prediction by the remaining-amount predicting unit, a date on which the gas remaining in the tank will be used up, a location obtaining unit that obtains location information indicating a location where the tank is placed, and a display control unit that controls a display unit to display an image in which remaining-gas information indicating the number of days predicted to elapse before the gas remaining in the tank is used up is superimposed on the location of the tank by using the date, on which the gas remaining in the tank will be used up, predicted by the replacement date predicting unit and the location information obtained by the location obtaining unit.

According to this aspect of the present disclosure, the display control unit controls the display unit to display the image in which the remaining-gas information indicating the number of days predicted to elapse before the gas remaining in the tank is used up is superimposed on the location of the tank. This enables effective display of the location of an LP gas tank needing to be replaced such that the tank can be identified.

BRIEF DESCRIPTION OF THE DRAWINGS

FIG. 1 is a block diagram illustrating an exemplary configuration of a remaining-LP-gas (hereinafter, also referred to simply as "remaining-gas") display control apparatus according to an embodiment;

FIG. 2 is a flowchart illustrating an exemplary process of the remaining-gas display control apparatus according to the embodiment;

FIGS. 3A to 3C illustrate a table for explaining a predicting process of the remaining-gas display control apparatus according to the embodiment with concrete numerical values;

DETAILED DESCRIPTION

Figure 4:
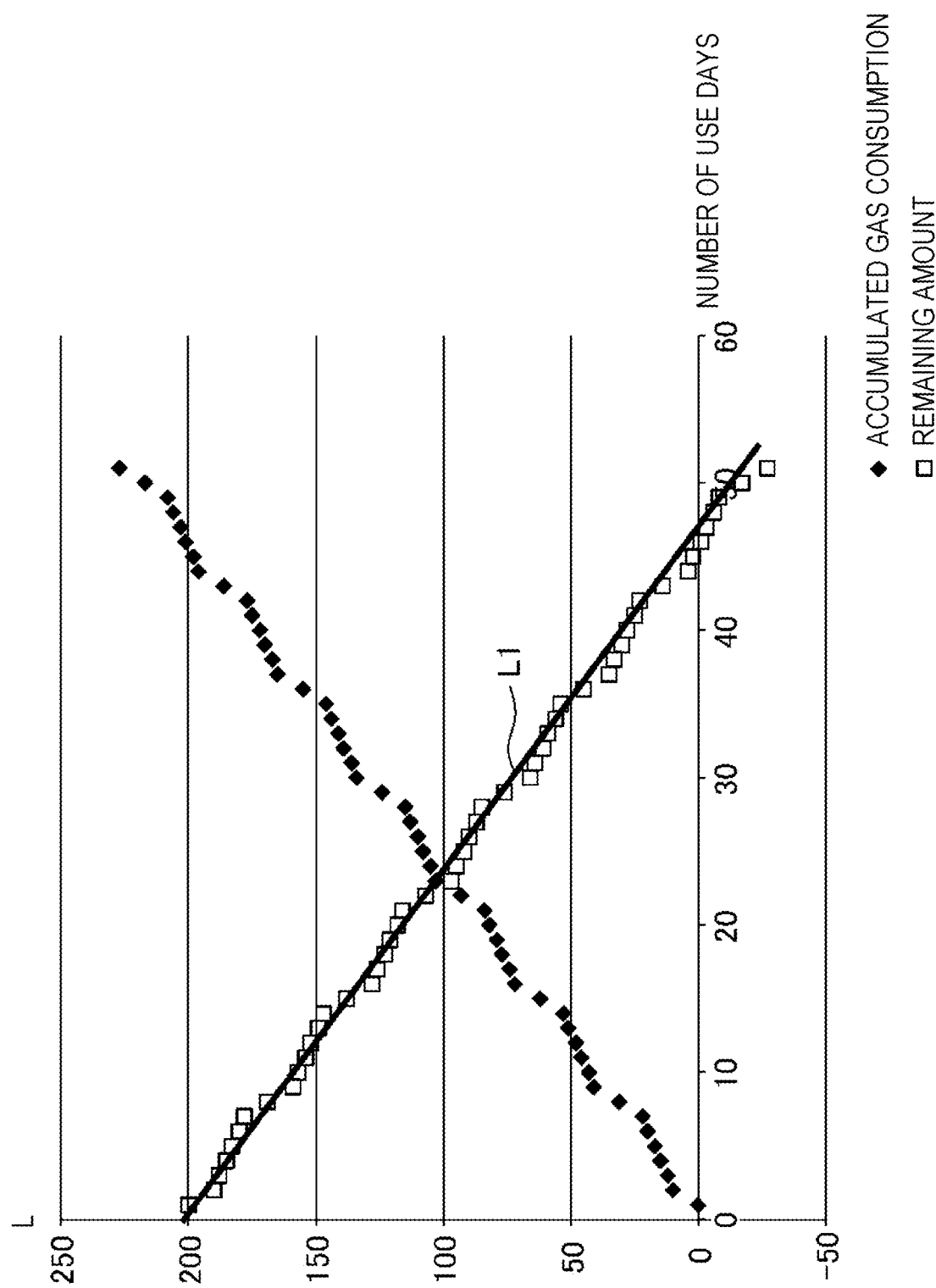
FIG. 4 illustrates a linear regression model representing the relationship between the number of days of use of a tank, the day of the week, and the amount of gas remaining in the tank.

FIG. 1 is a block diagram illustrating an exemplary configuration of a remaining-LP-gas (hereinafter, also referred to simply as "remaining-gas") display control apparatus 1 according to an embodiment. FIG. 1 further illustrates, for example, a tank 2 containing LP gas, a gas meter 3, a gas burner 4, a communication link 5, and a mobile terminal 6.

The gas in the tank 2 is supplied to the gas burner 4 via the gas meter 3. The gas meter 3 measures the amount of gas flowing from the tank 2 and transmits data about the amount of gas used, or gas consumption, to the remaining-gas display control apparatus 1 over the communication link 5.

Examples of the gas burner 4 include a gas stove burner, a gas water heater, and a gas space heater.

Examples of the mobile terminal 6 include a tablet computer and a smartphone. The mobile terminal 6 is carried by, for example, a gas operator belonging to a gas supplier. The mobile terminal 6 includes a display unit 6A. The remaining-gas display control apparatus 1 controls the display unit 6A to display an image on the display unit.

The remaining-gas display control apparatus 1 may be connected to a plurality of gas meters 3 and a plurality of tanks 2, serving as measurement targets of the gas meters 3, by the communication links 5. For the convenience of description, the single tank 2 and the single gas meter 3 are illustrated in FIG. 1. The remaining-gas display control apparatus 1 may be connected to a plurality of mobile terminals 6 by the communication links 5.

The remaining-gas display control apparatus 1 includes a consumption obtaining unit 10, a consumption predicting unit 11, a replacement date predicting unit 12, a storage unit 13, a location obtaining unit 14, and a display control unit 15. The remaining-gas display control apparatus 1 is built in a server managed by the gas supplier. The server is communicatively connected to the gas meter 3 and the mobile terminal 6 by the communication links 5.

The consumption obtaining unit 10 obtains a daily gas consumption in the tank 2 from the gas meter 3 over the communication link 5. The consumption obtaining unit 10 may receive information about a daily gas consumption from the gas meter 3 once a day or may receive information about a substantially daily gas consumption, that is, receive information about a gas consumption for each shorter period (for example, per hour) from the gas meter 3 and add the gas consumptions to obtain an accumulated gas consumption per day. In other words, the gas meter 3 transmits information from which a daily gas consumption is obtained. Upon obtaining information about a daily gas consumption, the consumption obtaining unit 10 stores the information about the gas consumption in the storage unit 13.

The storage unit 13 stores information accessible to the consumption obtaining unit 10, the consumption predicting unit 11, the replacement date predicting unit 12, the location obtaining unit 14, and the display control unit 15. The storage unit 13 stores information about each tank 2, such as information indicating the date when a previous tank was replaced with the tank 2, or the start date of use of the tank 2, information indicating the capacity of the tank 2, and location information indicating a location where the tank 2 is placed, in association with the tank 2. In addition to the above-described information about each tank 2, information indicating a gas consumption obtained by the consumption obtaining unit 10 and information indicating a replacement date predicted by the replacement date predicting unit 12 are stored in the storage unit 13 such that these information items are associated with the tank 2.

The consumption predicting unit 11 predicts future daily gas consumptions. Specifically, the consumption predicting unit 11 predicts each future gas consumption by using the gas consumptions obtained by the consumption obtaining unit 10, particularly, the latest gas consumption on the same day of the week as that of a date for which a gas consumption is intended to be predicted. A method of predicting a gas consumption by the consumption predicting unit 11 will be described in detail later. The consumption predicting unit 11 outputs information indicating the predicted future gas consumptions to the replacement date predicting unit 12.

The replacement date predicting unit 12 predicts the amounts of gas remaining in the tank 2 and a date on which the gas remaining in the tank 2 will be used up, or a replacement date, by using the gas consumptions obtained by the consumption obtaining unit 10 and the future gas consumptions predicted by the consumption predicting unit 11. The replacement date predicting unit 12 stores information indicating the predicted replacement date in the storage unit 13.

The location obtaining unit 14 obtains the location information indicating the location where the tank 2 is placed from the storage unit 13. The location obtaining unit 14 outputs the obtained location information to the display control unit 15. The location information is represented by coordinates of longitude and latitude, for example.

The display control unit 15 controls the display unit 6A to display an image in which remaining-gas information indicating the number of days predicted to elapse before the gas remaining in the tank 2 is used up is superimposed on the location of the tank 2 by using the replacement date predicted by the replacement date predicting unit 12 and the location information obtained by the location obtaining unit 14. The display control unit 15 reads the replacement date, predicted by the replacement date predicting unit 12, from the storage unit 13 and uses the replacement date.

Specifically, the display control unit 15 generates an image signal and outputs the signal to the display unit 6A of the mobile terminal 6 via the communication link 5. For example, the display control unit 15 generates an image signal representing an image of FIG. 6, which will be described later, and outputs the signal to the display unit 6A.

The remaining-gas display control apparatus 1 includes a communication device, a memory, and a processor. The processor runs programs stored in the memory, thus achieving processes of the consumption obtaining unit 10, the consumption predicting unit 11, the replacement date predicting unit 12, the location obtaining unit 14, and the display control unit 15. A plurality of processors may be operatively connected to a plurality of memories.

An exemplary process by the remaining-gas display control apparatus 1 with the above-described configuration will now be described with reference to a flowchart of FIG. 2.

The consumption obtaining unit 10 obtains a daily gas consumption in the tank 2 from the gas meter 3 via the communication link 5 (step ST1). The obtained gas consumption is associated with, for example, day-of-week information, and is stored in the storage unit 13.

Then, the consumption predicting unit 11 predicts future daily gas consumptions for a set number of days by using gas consumptions obtained by the consumption obtaining unit 10 and stored in the storage unit 13 (step ST2). Information indicating the predicted gas consumptions is output to the replacement date predicting unit 12.

FIGS. 3A to 3C illustrate a table for explaining a predicting process of the remaining-gas display control apparatus 1 with concrete numerical values.

For example, a case will be described below in which the amount of gas remaining in the tank 2 is 200 liters at the time when the number of use days is zero, that is, the tank 2 has a capacity of 200 liters. The term "number of use days" as used herein refers to the number of days elapsed since the start of use of the tank 2.

As illustrated in FIG. 3A, assume that gas consumptions for the numbers of use days ranging between 1 and 7 are 10 liters, 2 liters, 3 liters, 2 liters, 3 liters, 2 liters, and 9 liters. The day of the week on which the number of use days is 1 is Sunday, and the day of the week on which the number of use days is 7 is Saturday.

The consumption predicting unit 11 starts to predict future daily gas consumptions for a set number of days for the tank 2 when at least seven gas consumptions for the days of the week from Monday to Sunday are obtained. The set number of days is determined based on a preset "number of days for prediction". The term "number of days for prediction" as used herein refers to the number of days for which a gas consumption is intended to be predicted. For example, the number of days for prediction may be set to the set number of days. The sum of the number of days for prediction and several days may be set to the set number of days. For example, a case will be described below in which the number of days for prediction is one week and the set number of days is the number of days for prediction×2.

When the consumption obtaining unit 10 obtains gas consumptions, measured by the gas meter 3, for the numbers of use days up to 7, the consumption predicting unit 11 predicts future gas consumptions for two weeks, serving as the set number of days, that is, a future daily gas consumption for each of the numbers of use days ranging between 8 and 21. The prediction by the consumption predicting unit 11 is based on an assumption that the gas will be consumed as much as the latest gas consumption on the same day of the week included in the gas consumptions obtained by the consumption obtaining unit 10. The reason is that typical gas consumption behavior tends to depend on the day of the week.

For example, the day of the week on which the number of use days is 8 is Sunday. Therefore, a daily gas consumption of 10 liters, which has been obtained most recently as a gas consumption on Sunday, on the day on which the number of use days is 1 is predicted as a gas consumption on the day on which the number of use days is 8.

Similarly, since the day of the week on which the number of use days is 9 is Monday, a daily gas consumption of 2 liters, which has been obtained most recently as a gas consumption on Monday, on the day on which the number of use days is 2 is predicted as a gas consumption on the day on which the number of use days is 9.

Daily gas consumptions for the numbers of use days ranging between 10 and 21 are similarly obtained. A period between the day on which the number of use days is 1 and the day on which the number of use days is 7 corresponds to a learning period. The daily gas consumptions for the numbers of use days ranging between 8 and 21 are predicted based on the daily gas consumptions in the learning period.

This prediction is performed each time the consumption obtaining unit 10 obtains a new daily gas consumption. For example, when information indicating a daily gas consumption is transmitted from the gas meter 3 on the day on which the number of use days is 8, the consumption predicting unit 11 predicts gas consumptions for the numbers of use days ranging between 9 and 22 by using the gas consumptions for the numbers of use days ranging between 2 and 8. Predicted values are updated in the above-described manner each time the consumption obtaining unit 10 obtains a new daily gas consumption.

The replacement date predicting unit 12 predicts a date on which the gas remaining in the tank 2 will be used up by using the gas consumptions obtained by the consumption obtaining unit 10 and stored in the storage unit 13 and the future gas consumptions for the set number of days predicted by the consumption predicting unit 11 (step ST3).

The replacement date predicting unit 12 subtracts an accumulated value of the gas consumptions obtained so far by the consumption obtaining unit 10 and each of the predicted future gas consumptions for the set number of days obtained by the consumption predicting unit 11 from the capacity of the tank 2, thus predicting the amount of gas remaining in the tank 2 for each of the set number of days. As described above, the replacement date predicting unit 12 functions as a remaining-amount predicting unit that predicts future amounts of gas remaining in the tank for the set number of days. When the replacement date predicting unit 12 predicts, based on prediction by the remaining-amount predicting unit, that the amount of gas remaining in the tank will reach zero on any of the days in a period corresponding to the set number of days, the replacement date predicting unit 12 regards the day, on which the amount of gas remaining in the tank is predicted to reach zero, as a replacement date.

Referring to FIGS. 3B and 3C, gas consumptions for the numbers of use days ranging between 36 and 49 are predicted based on gas consumptions for the numbers of use days ranging between 29 and 35. The amount of gas remaining in the tank is predicted to reach zero on the day on which the number of use days is 45.

As described above, the remaining-gas display control apparatus 1 obtains a daily gas consumption from the gas meter 3, thus accurately predicting future gas consumptions, the amounts of gas remaining in the tank 2, and the replacement date.

The above-described method of prediction is heuristic prediction. In the heuristic prediction, specific days, such as the Golden Week holidays or the year-end and New Year holidays, included in a learning period tend to lead to incorrect prediction. For this reason, the remaining-gas display control apparatus 1 may be configured to perform prediction by using not only the heuristic prediction but also a linear regression model or a nonlinear regression model in combination.

A method of prediction in combination with a linear regression model will now be described. In the linear regression model, the relationship between the number of use days, the day of the week, and the amount of gas remaining in the tank is expressed by the following equation. The data illustrated in FIGS. 3A to 3C is modeled as a line L1 in FIG. 4. FIG. 4 further illustrates accumulated gas consumptions. In FIG. 4, an interval in which the remaining amounts are approximately zero or negative values is an extrapolation interval.

$$Y=\beta_0+\beta_1 X_1+\beta_2 X_2+\ldots+\beta_p X_p+\varepsilon \qquad (1)$$

where Y denotes the amount of gas remaining in the tank, $\beta$ denotes the number of use days, and X denotes day-of-week information converted to a dummy variable.

If gas consumptions obtained by the consumption obtaining unit 10 include gas consumptions on specific days and the gas consumptions on the specific days are used for prediction by the consumption predicting unit 11, that is, if the learning period includes the specific days, the replacement date predicting unit 12, serving as the remaining-amount predicting unit, corrects the remaining amounts predicted based on the gas consumptions on the specific days. The correction uses the above-described linear regression model, which can be calculated based on, for example, daily gas consumptions in the previous month. The linear regression model used for correction is not limited to that based on the gas consumptions in the previous month. The linear regression model may be based on gas consumptions in a prior period, such as gas consumptions in the second previous month as well as the previous month or gas consumptions in a period between the time of start of use of a previous tank and the time of replacement of the previous tank.

For example, assume that the replacement date predicting unit 12, serving as the remaining-amount predicting unit, calculates future daily remaining amounts for the set number of days by using gas consumptions predicted by the consumption predicting unit 11, the remaining amount on Thursday, two days later, is R1, and Thursday in the learning period is a specific day. In such a case, the replacement date predicting unit 12, serving as the remaining-amount predicting unit, separately calculates a remaining amount on a prediction target day D, or Thursday, which is two days later and on which the remaining amount is R1, by using the above-described linear regression model. The term "prediction target day" as used herein refers to a day for which the remaining-gas display control apparatus 1 performs prediction, and corresponds to each future day of the set number of days.

Let R2 denote the remaining amount on the prediction target day D calculated separately by using the linear regression model. The replacement date predicting unit 12, serving as the remaining-amount predicting unit, assigns weights to the remaining amounts as expressed in the following equation, thereby obtaining a corrected remaining amount R. Then, daily remaining amounts on the days after Thursday, two days later, are calculated based on an assumption that the corrected remaining amount on Thursday, two days later, is R.

$$R = aR1 + bR2 \quad (2)$$

where a and b have the following relationship: a+b=1.

Figure 5:
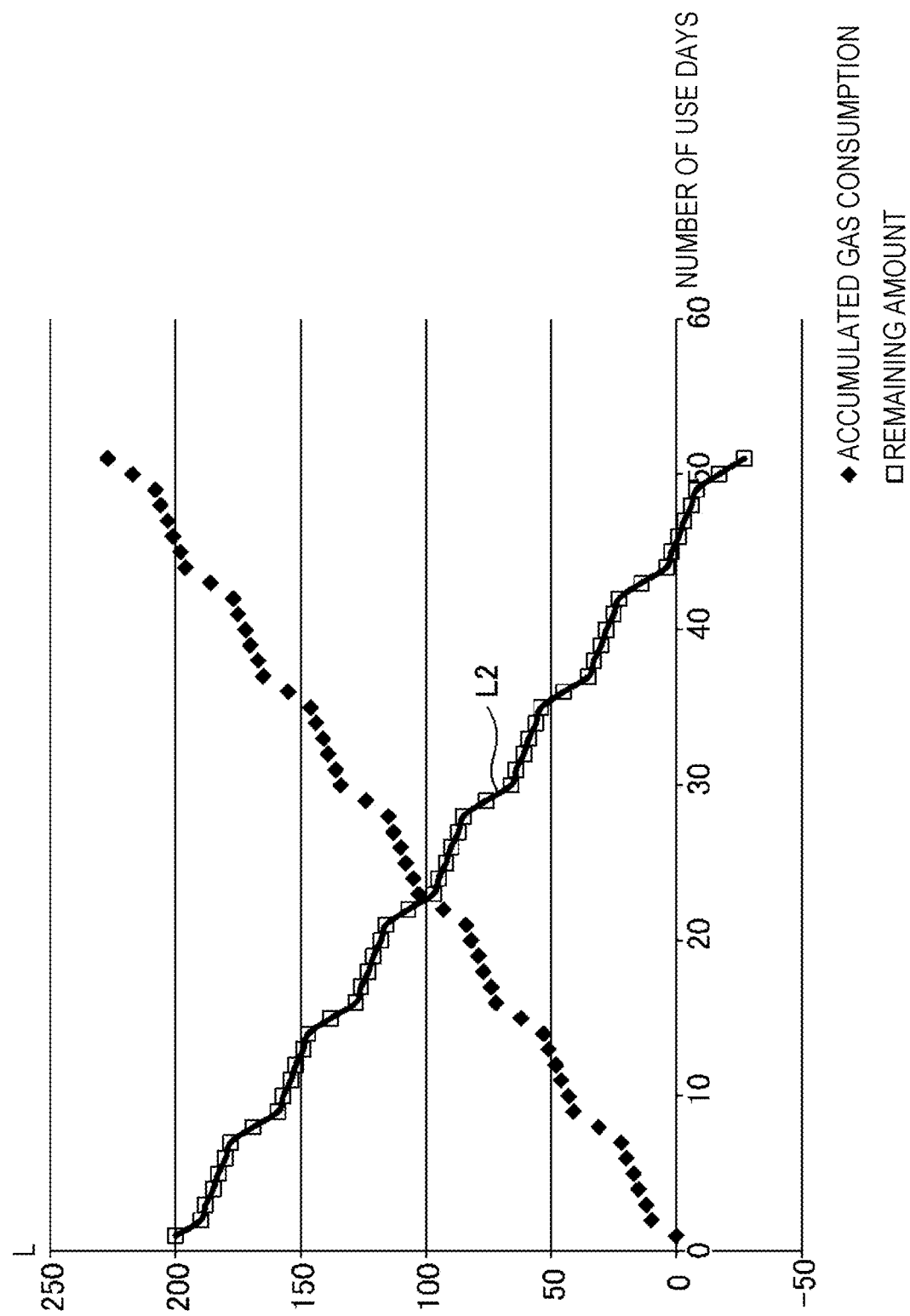
FIG. 5 illustrates a nonlinear regression model representing the relationship between the number of use days, the day of the week, and the amount of gas remaining in the tank.

A method of prediction in combination with a nonlinear regression model will now be described. In the nonlinear regression model, the relationship between the number of use days, the day of the week, and the amount of gas remaining in the tank is expressed by the following equation. The data illustrated in FIGS. 3A to 3C is subjected to overfitting or overtraining, so that the data is modeled as a curve L2 in FIG. 5. FIG. 5 further illustrates accumulated gas consumptions. In FIG. 5, an interval in which the remaining amounts are approximately zero or negative values is an extrapolation interval.

$$y = f(x, \beta) \quad (3)$$

where y denotes the remaining amount, x denotes a vector representing day-of-week information, and β denotes the number of use days.

In predicting the amount of gas remaining in the tank 2, the replacement date predicting unit 12, serving as the remaining-amount predicting unit, compares a current gas remaining amount R3 calculated by subtracting an accumulated value of the gas consumptions, obtained from the gas meter 3 through the consumption obtaining unit 10, from the capacity of the tank 2 with a current gas remaining amount R4 calculated separately by using the nonlinear regression model based on the numbers of use days, the days of the week, and the amounts of gas remaining in the tank. The nonlinear regression model is calculated based on, for example, daily gas consumptions in the previous month. The nonlinear regression model is not limited to that based on the gas consumptions in the previous month. The nonlinear regression model may be based on gas consumptions in a prior period, such as gas consumptions in the second previous month as well as the previous month or gas consumptions in a period between the time of start of use of a previous tank and the time of replacement of the previous tank.

If the comparison indicates that the remaining amount R3 is smaller than the remaining amount R4 and the amount of gas remaining in the tank is reduced at a rate higher than that in a prior period, such as the previous month, the replacement date predicting unit 12, serving as the remaining-amount predicting unit, corrects remaining amounts on prediction target days calculated based on gas consumptions predicted by the consumption predicting unit 11 in such a manner that, for example, each of the remaining amounts on the prediction target days is reduced by subtracting a constant value from the remaining amount, and then predicts a date on which the remaining gas will be used up.

If the comparison indicates that the remaining amount R3 is larger than the remaining amount R4 and the amount of gas remaining in the tank is reduced at a rate lower than that in a prior period, such as the previous month, the replacement date predicting unit 12, serving as the remaining-amount predicting unit, corrects remaining amounts on prediction target days calculated based on gas consumptions predicted by the consumption predicting unit 11 in such a manner that, for example, each of the remaining amounts on the prediction target days is increased by adding a constant value to the remaining amount, and then predicts a date on which the remaining gas will be used up.

As described above, the prediction in combination with the linear regression model or the nonlinear regression model by the remaining-gas display control apparatus 1 enhances the reliability of prediction.

The replacement date predicting unit 12 predicts the replacement date in the above-described manner, and stores the predicted replacement date as information about the tank 2 in the storage unit 13.

The prediction of the replacement date is performed for each tank 2 connected to the remaining-gas display control apparatus 1 by the communication link 5. The storage unit 13 stores the predicted replacement date for each tank 2.

The location obtaining unit 14 obtains the location information indicating the location of the tank 2 from the storage unit 13 (step ST4). At this time, the location obtaining unit 14 targets at least one tank 2 located in an area displayed on the display unit 6A and obtains the location information about the tank 2. For example, the gas operator having the mobile terminal 6 operates an input unit (not illustrated), such as a keyboard or a touch panel, of the mobile terminal 6 to specify an area to be displayed on the display unit 6A. Consequently, the mobile terminal 6 transmits information indicating the specified area defined by coordinates of longitude and latitude to the remaining-gas display control apparatus 1 via the communication link 5. The location obtaining unit 14 extracts and obtains location information indicating a location included in the area, indicated by the information transmitted from the mobile terminal 6, from the storage unit 13.

The location obtaining unit 14 outputs the obtained location information to the display control unit 15.

Upon receiving the location information from the location obtaining unit 14, the display control unit 15 identifies the tank 2 about which the information is stored in the storage unit 13 in association with the received location information, and reads and obtains the predicted replacement date for the identified tank 2 from the storage unit 13. As described above, the display control unit 15 targets at least one tank 2 placed in an area displayed on the display unit 6A and obtains the predicted replacement date for the target tank stored in the storage unit 13.

Then, the display control unit 15 controls the display unit 6A to display an image in which the remaining-gas information indicating the number of days predicted to elapse before the gas remaining in the tank 2 is used up is superimposed on the location of the tank 2 by using the obtained replacement date and the location information (step ST5).

Figure 6:
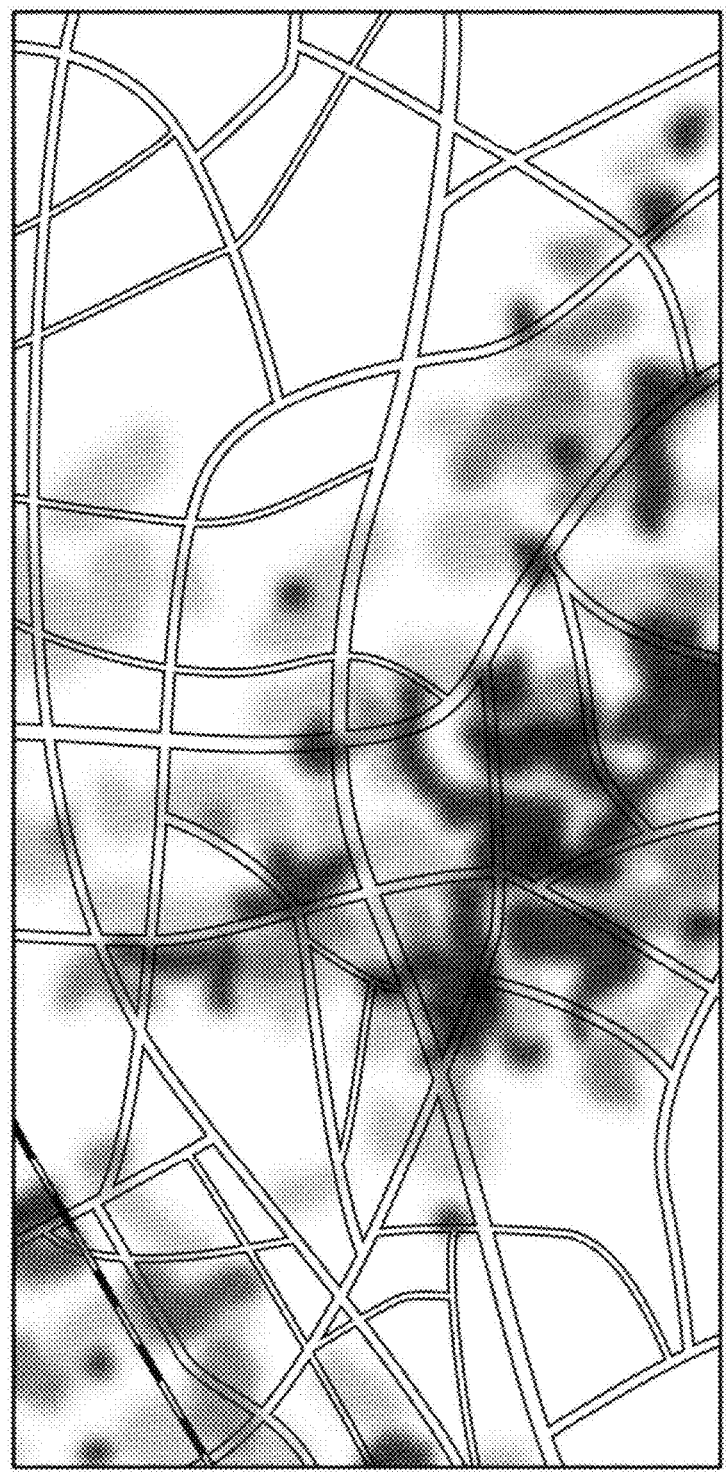
FIG. 6 illustrates an exemplary image displayed under control of the remaining-gas display control apparatus according to the embodiment.

FIG. 6 is an exemplary image displayed on the display unit 6A under control of the display control unit 15. The image of FIG. 6 is a map image in which remaining-gas information items are superimposed on the locations of tanks 2 in a map. In the map image, colors representing the remaining-gas information are superimposed on the locations of the tanks 2. The colors depend on the number of days predicted to elapse before the gas remaining in the tank 2 is used up. In other words, the image of FIG. 6 is a heat map representing the numbers of days predicted to elapse before the gas remaining in the tanks 2 is used up. Map image data is stored in, for example, the storage unit 13. The display control unit 15 reads the map image data corresponding to an area, indicated by the information transmitted from the mobile terminal 6 as described with respect to step ST4, from the storage unit 13 and uses the map image data.

In FIG. 6, for example, the first darkest gray represents that the number of days predicted to elapse before the gas remaining in the tank 2 is used up is one day, or the location of the tank 2 predicted to empty tomorrow, the second darkest gray represents that the number of days predicted to elapse before the gas remaining in the tank 2 is used up is two days, or the location of the tank 2 predicted to empty in two days, and the third darkest gray represents that the number of days predicted to elapse before the gas remaining in the tank 2 is used up is three or more days, or the location of the tank 2 predicted to empty in three or more days. A location with no color is a location with no tank 2.

For the colors depending on the number of days predicted to elapse before the gas remaining in the tank 2 is used up, another assignment may be used in addition to the above-described assignment of different color intensities, such as a grayscale. For example, different kinds of colors may be used in such a manner that red represents the location of the tank 2 for which the number of days predicted to elapse before the gas remaining in the tank 2 is used up is one day, green represents the location of the tank 2 for which the number of days predicted to elapse before the gas remaining in the tank 2 is used up is two days, and blue represents the location of the tank 2 for which the number of days predicted to elapse before the gas remaining in the tank 2 (hereinafter, also referred to simply as "the number of days predicted") is used up is three or more days.

In addition to the colors, symbols depending on the numbers of days predicted, for example, ●, ♦, and x, may be used to represent the remaining-gas information. Additionally, the remaining-gas information may be a numeral indicating the number of days predicted. In FIG. 6, the numbers of days predicted are divided into the following three levels: a first level at which the number of days predicted is one day; a second level at which the number of days predicted is two days; and a third level at which the number of days predicted is three or more days. The remaining-gas information may be superimposed only on the locations of the tanks 2 for which the number of days predicted is one day in such a manner that the remaining-gas information is not superimposed on the locations of the tanks 2 for which the numbers of days predicted are values other than one. Although the numbers of days predicted are divided into the three levels (the first level at which the number of days predicted is one day, the second level at which the number of days predicted is two days, and the third level at which the number of days predicted is three or more days), another division into levels may be used. For example, the numbers of days predicted may be divided into the following three levels: a first level at which the number of days predicted is greater than or equal to 1 and less than 3; a second level at which the number of days predicted is greater than or equal to 3 and less than 8; and a third level at which the number of days predicted is greater than or equal to 8.

In some embodiments, the display control unit 15 controls the display unit 6A to display, instead of a map image as illustrated in FIG. 6, an aerial photographic image in which remaining-gas information is superimposed on the locations of the tanks 2 in an aerial photograph. In such a case, the storage unit 13 stores aerial photographic image data.

Figure 7:
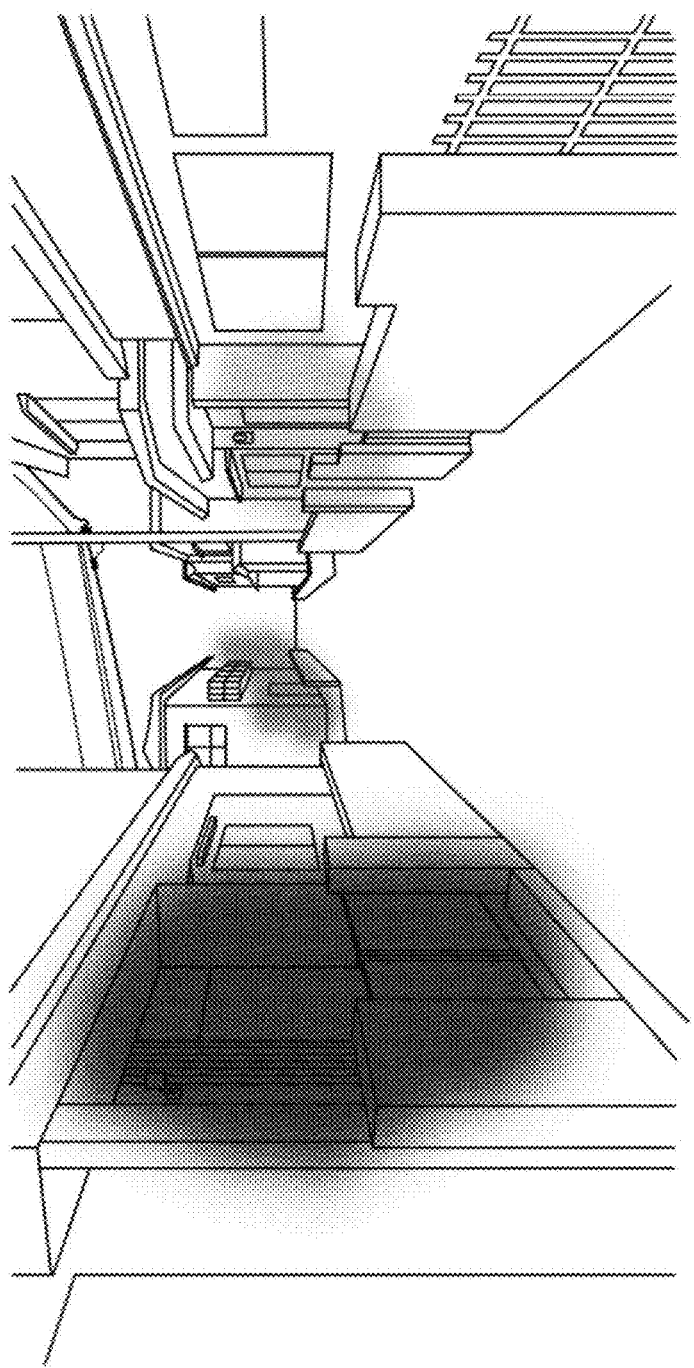
FIG. 7 illustrates another exemplary image displayed under control of the remaining-gas display control apparatus according to the embodiment.

In some embodiments, the display control unit 15 controls the display unit 6A to display an augmented reality (AR) image in which, as illustrated in FIG. 7, remaining-gas information is superimposed on the locations of the tanks 2 in a landscape. In such a case, the display unit 6A is an AR display unit, which is implemented as goggles that fit closely to the face of, for example, a gas operator. The mobile terminal 6 including the goggles includes a device that obtains current positional information, for example, a global positioning system (GPS) receiver, and transmits the current positional information to the location obtaining unit 14. The location obtaining unit 14 obtains necessary location information from the storage unit 13 by using the received current positional information. FIG. 7 illustrates an example in which the numbers of days predicted are represented by using three grayscale levels in the same way as in FIG. 6.

Examples of the AR display unit 6A include, in addition to the above-described goggles, a display unit included in a tablet computer and a display unit included in a smartphone. If the display unit 6A is included in a tablet computer or a smartphone, the display unit 6A displays a landscape image captured through a camera included in the tablet computer or the smartphone, and remaining-gas information is superimposed on the landscape image displayed on the display unit 6A, thereby providing an AR image to, for example, a gas operator.

Since the image, in which the remaining-gas information indicating the number of days predicted to elapse before the gas remaining in the tank 2 is used up is superimposed on the location of each tank 2, is provided to the gas operator, the gas operator can easily find the tank 2 that needs to be replaced.

As described above, the remaining-gas display control apparatus 1 is built in the server managed by the gas supplier. In some embodiments, the components of the remaining-gas display control apparatus 1 are separately arranged in the server and the mobile terminal 6 in such a manner that the mobile terminal 6 includes the location obtaining unit 14 and the display control unit 15, the server includes the consumption obtaining unit 10, the consumption predicting unit 11, the replacement date predicting unit 12, and the storage unit 13, and the mobile terminal 6 transmits and receives various pieces of information to and from the server.

In some embodiments, the gas meter 3 includes a memory having a large capacity, and further includes units having replacement date predicting functions and corresponding to, for example, the consumption obtaining unit 10, the consumption predicting unit 11, the replacement date predicting unit 12, and the storage unit 13. The gas meter 3 transmits information indicating a predicted replacement date to the server managed by the gas supplier, and the server allows the location obtaining unit 14 and the display control unit 15 to perform the process by using the received information.

As described above, the display unit 6A of the mobile terminal 6 is a target to be controlled, and the remaining-gas display control apparatus 1 controls the display unit 6A of the mobile terminal 6, or controls display on the display unit.

In some embodiments, a stationary display unit installed in, for example, a monitoring center of the gas supplier, is a target to be controlled. The stationary display unit is caused to display, for example, the image of FIG. 6.

As described above, according to the embodiment, the display control unit 15 controls the display unit 6A to display an image, in which remaining-gas information indicating the numbers of days predicted to elapse before the gas remaining in the tanks 2 is used up is superimposed on the locations of the tanks 2, by using replacement dates predicted by the replacement date predicting unit 12 and location information obtained by the location obtaining unit 14. The remaining-gas display control apparatus 1 enables effective display of the location of an LP gas tank 2 needing to be replaced such that the tank can be identified in the above-described manner.

As described above, the remaining-gas information is represented by colors depending on the number of days predicted to elapse before the gas remaining in the tank 2 is used up. Therefore, a gas operator can easily identify, particularly, a tank 2 in which the remaining gas is likely to be used up.

As described above, the display control unit 15 controls the display unit 6A to display a map image in which the remaining-gas information is superimposed on the locations of the tanks 2 in a map. Therefore, a gas operator can easily identify a tank 2 in which the remaining gas is likely to be used up in the map.

As described above, the display control unit 15 controls the display unit 6A to display an aerial photographic image in which the remaining-gas information is superimposed on the locations of the tanks 2 in an aerial photograph. Therefore, a gas operator can easily identify a tank 2 in which the remaining gas is likely to be used up in the aerial photograph.

As described above, the display control unit 15 controls the AR display unit 6A to display an AR image in which the remaining-gas information is superimposed on the locations of the tanks 2 in a landscape. Therefore, a gas operator can easily identify a tank 2 in which the remaining gas is likely to be used up in the landscape within sight of the operator.

As described above, the display control unit 15 controls the display unit 6A included in the mobile terminal 6. Therefore, a gas operator can easily identify a tank 2 in which the remaining gas is likely to be used up while moving.

Any of the constituent elements of the embodiments can be modified or omitted within the scope of the present disclosure.

What is claimed is:

1. A remaining-LP-gas display control apparatus, comprising:
   circuitry configured to
   obtain daily gas consumptions for a tank containing gas;
   predict a plurality of future daily gas consumptions for a set number of days such that each future daily gas consumption is predicted based on (1) a latest gas consumption on a same day of a week included in the obtained daily gas consumptions, and (2) outputs of a regression model;
   predict an amount of the gas remaining in the tank for each of the set number of days by using the obtained daily gas consumptions and the predicted future gas consumptions for the set number of days;
   predict, based on the prediction of the amount of gas remaining for each of the set number of days, a date on which the gas remaining in the tank will be used up;
   obtain location information indicating a location of the tank; and
   control a display to display an image in which remaining-gas information, indicating a number of days predicted to elapse before the gas remaining in the tank is used up, is superimposed on the location of the tank, by using the predicted date, on which the gas remaining in the tank will be used up and the obtained location information.

2. The apparatus according to claim 1, wherein the circuitry is further configured to cause the display to display the remaining-gas information represented by a color that depends on the number of days predicted to elapse before the gas remaining in the tank is used up.

3. The apparatus according to claim 1, wherein the circuitry is further configured to control the display to display a map image in which the remaining-gas information is superimposed on the location of the tank in a map.

4. The apparatus according to claim 1, wherein the circuitry is further configured to control the display to display an aerial photographic image in which the remaining-gas information is superimposed on the location of the tank in an aerial photograph.

5. The apparatus according to claim 1, wherein the display is an augmented reality display, and the circuitry is further configured to control the augmented reality display to display an augmented reality image in which the remaining-gas information is superimposed on the location of the tank in a landscape.

6. The apparatus according to claim 1, wherein the circuitry is further configured to control the display, which is included in a mobile terminal.

7. The apparatus of claim 1, wherein the circuitry is further configured to predict the future daily gas consumptions using a linear regression model as the regression model.

8. The apparatus of claim 1, wherein the circuitry is further configured to predict the future daily gas consumptions using a nonlinear regression model as the regression model.

9. A remaining-LP-gas display control method, comprising:
   obtaining daily gas consumptions for a tank containing gas;
   predicting a plurality of future daily gas consumptions for a set number of days such that each future daily gas consumption is predicted based on (1) a latest gas consumption on a same day of a week included in the obtained daily gas consumptions, and (2) outputs of a regression model;
   predicting an amount of the gas remaining in the tank for each of the set number of days by using the obtained daily gas consumptions and the predicted future gas consumptions for the set number of days;
   predicting, based on the prediction of the amount of gas remaining for each of the set number of days, a date on which the gas remaining in the tank will be used up;
   obtaining location information indicating a location of the tank; and
   controlling a display to display an image in which remaining-gas information, indicating a number of days predicted to elapse before the gas remaining in the tank is used up, is superimposed on the location of the tank, by using the predicted date, on which the gas remaining in the tank will be used up, and the obtained location information.

10. A remaining-LP-gas display control apparatus, comprising:
   circuitry configured to
   obtain daily gas consumptions for a tank containing gas;
   predict a plurality of future daily gas consumptions for a set number of days such that each future daily gas consumption is predicted based on a latest gas consumption on a same day of a week included in the obtained daily gas consumptions;
   predict an amount of the gas remaining in the tank for each of the set number of days by using the obtained daily gas consumptions and the predicted future gas consumptions for the set number of days;
   predict, based on the prediction of the amount of gas remaining for each of the set number of days, a date on which the gas remaining in the tank will be used up;
   obtain location information indicating a location of the tank; and
   control a display to display an image in which remaining-gas information, indicating a number of days predicted to elapse before the gas remaining in the tank is used up, is superimposed on the location of the tank, by using the predicted date on which the gas remaining in the tank will be used up and the obtained location information,
   wherein the circuitry is further configured to control the display to display a map image in which the remaining-gas information is superimposed on the location of the tank in a map.

* * * * *